Patented Aug. 28, 1945

2,383,905

UNITED STATES PATENT OFFICE 2,383,905

LUBRICANTS

John C. Zimmer and George M. McNulty, Union, N. J., assignors to Standard Oil Development Company, a corporation of Delaware No Drawing. Application December 9, 1942,
Serial No. 468,421

3 Claims. (Cl. 252—35)

The present invention relates to improved lubricants and to methods of preparing and using same.

In the field of lubrication lubricants are often required to withstand extremely exacting conditions in addition to providing adequate lubrication. Where it is necessary to deal with the presence of water either continuously or intermittently the problem of lubrication is always seriously complicated. Water or other aqueous fluids tend to wash away the lubricant by emulsification or otherwise impair the performance of the lubricant. This is especially true, for instance, in steel mills where the metal being rolled is subjected to a spray of water at high pressure for the purpose of removing oxide scale. The rolls used in fabricating steel operate at an excessively high pressure as do also the gears which operate the rolls. The roll bearings and the gears therefore require an extreme pressure lubricant in their operation. Additional water is used to cool the rolls and some of this water, in addition to some of that sprayed upon the metal seeps into the roll bearings and the gear boxes. One of the most common extreme pressure lubricants used around a rolling mill is a mineral oil to which a little soap and a oiliness agent has been added. Lubricants containing lead soaps are very prone to emulsify with water. This emulsification of water by the lubricant is a definite defect and leads to several objectionable results. In the roll bearings the lubricant is forced out as the emulsification and consequent volume increase continues until a point is reached where the lubricant is so dilute that adequate lubrication is no longer maintained. In the gear cases the lubricant overflows the case as emulsification progresses instead of being forced out by pressure as in the roll bearings. In any event the ultimate result, insofar as lubrication is concerned, is the same. In addition to causing inadequate lubrication, this loss of emulsifying lubricant creates a distinct hazard to the safety of the workmen, since the lost lubricant spreads over the floor making the floor slippery.

The present invention has for one of its primary objects the preparation of extreme pressure lubricants which will not take up water, thus making them especially suitable for the lubrication of machinery operated either in water or in continuous or at least occasional contact with water. Another object of this invention is to prepare extreme pressure lubricants which are especially resistant to water which contains high amounts of acid and mineral salts or other materials which normally promote emulsification of mineral oil and water. Still another object of the present invention is to conserve lubricating materials by providing a lubricant which will not be lost either through emulsification or displacement with water. An additional object is to reduce to some extent at least the hazards to safety around rolling mills due to slippery floors caused by lubricant either washed or overflowing from the mill equipment. Other and further objects will be apparent to those skilled in the art from a reading of the following description.

Broadly the invention comprises a mineral lubricating oil base stock derived from asphaltic crudes with a heavy lead soap either alone or in combination with other materials giving mineral oils additional load bearing characteristics, an oiliness agent, and 50% of water by weight. It has now been found that extreme pressure lubricants, particularly those containing a lead soap, can be completely saturated with water and when thus saturated, further quantities of water are then "shed" or are not absorbed. It has been further found that extreme pressure lubricants containing lead soaps will absorb or emulsify an amount of water at least equal in weight to the weight of the lubricant and in some instances an even greater weight of water than oil will be emulsified or absorbed. The ratio of water to lubricant to secure complete saturation will range between 1 of water to 1 of lubricant by weight to 3 of water to 1 of lubricant.

The extreme pressure lubricant exclusive of water comprises a mineral lubricating oil of asphaltic base stock, an oiliness agent and a material which enhances the load-bearing characteristics of the mineral lubricating oil. Although for the purposes of this invention it is preferred to use an asphaltic base mineral lubricating oil of approximately 50 vis. at 210° F., any oil of similar origin ranging in viscosity from 10 to 150 vis. at 210° F. may be chosen to meet particular conditions. Any of the well-known oiliness agents, such as lard oil, sperm oil may be used. The constituent of the lubricant used to impart load-bearing characteristics to the mineral lubricating oil is preferably a lead soap such as lead oleate, lead naphthenate or other fatty acid soap of lead. The function of the lead soap may be complemented or enhanced by the addition to the lead soap of one or more other E. P. agents, such as sulfurized fatty oils, chlorinated hydrocarbons or sulfur- and chlorine-containing hydrocarbons. The composition of the lubricant exclusive of water will comprise from 50 to 75% mineral lubricating oil, 20-35% E. P. agent and from 5 to 15% of an oiliness agent. In compounding the lubricant, exclusive of the water, the mineral oil is placed in a cooking kettle equipped with a stirrer and heated to about 150° F. The E. P. and oiliness agents are then stirred into the oil and the stirring is continued for a time sufficient to permit the added ingredients to dissolve. The mixture can be then removed from the kettle and permitted to cool or it can be allowed to cool in the kettle.

The water-saturated compounded lubricant is prepared by putting a quantity of mineral lubricating oil with added E. P. and oiliness agents into a vessel equipped with a stirrer at room temperature and then adding water while stirring until the oil will absorb no more water. A lubricant prepared in this manner has been tested in the gear cases of a steel rolling mill and has been found not to absorb any additional water. Any water entering a gear case containing lubricant made in accordance with the teaching of the present invention was not absorbed and could be removed from the gear case by a valve provided for such purpose without the loss of any lubricant.

The invention may be illustrated and thus better understood by the following example.

*Example*

The following blend was made:

| | Per cent |
|---|---|
| Lead oleate | 10.0 |
| Asphaltic mineral oil (60 vis./210° F. S. S. U.) | 40.0 |
| Water | 50.10 |

On the Timken machine this composition had an O. K. load of 45 lbs. as against a minimum of 33 lbs. required. A similar lubricant without the water present (20% lead oleate, 80% asphaltic mineral oil) will carry a Timken O. K. load of 50-60 lbs.

The products of this invention are useful for many different industrial applications. For instance, in addition to the lubrication of steel mill equipment they may also be used for lubricating the bearings in cold roll mills, submerged gears and bearings in marine vessels, creameries, paper mills or any other installations where machinery is operated in the presence of water.

What is claimed is:

1. An extreme pressure lubricant consisting of an emulsion of one part of a mixture of from 50-75% mineral lubricating oil, 20-35% lead soap of a high molecular weight fatty acid and 5-15% of an oiliness agent, in from 1-3 parts of water.

2. An extreme pressure lubricant consisting of an emulsion of one part of a mixture of from 50-75% mineral lubricating oil, 20-35% lead oleate and 5-15% of sperm oil, in from 1-3 parts of water.

3. An extreme pressure lubricant consisting of 10% lead oleate, 40% asphaltic mineral lubricating oil and 50% water.

JOHN C. ZIMMER.
GEORGE M. McNULTY.